(12) United States Patent
Zhang et al.

(10) Patent No.: US 8,195,942 B2
(45) Date of Patent: Jun. 5, 2012

(54) NETWORK SECURITY AUTHENTICATION METHOD

(75) Inventors: Tao Zhang, Shenzhen (CN); Zhong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 876 days.

(21) Appl. No.: 10/531,569

(22) PCT Filed: Sep. 22, 2003

(86) PCT No.: PCT/CN03/00801
§ 371 (c)(1),
(2), (4) Date: Apr. 18, 2005

(87) PCT Pub. No.: WO2004/036828
PCT Pub. Date: Apr. 29, 2004

(65) Prior Publication Data
US 2005/0283607 A1 Dec. 22, 2005

(30) Foreign Application Priority Data
Oct. 18, 2002 (CN) .................................. 02 1 44191

(51) Int. Cl.
*H04L 29/06* (2006.01)
(52) U.S. Cl. ........................................... 713/170; 726/2
(58) Field of Classification Search ................. 709/230, 709/224–227; 713/150–156, 168–170; 370/401, 370/352; 726/2
See application file for complete search history.

(56) References Cited

U.S. PATENT DOCUMENTS

| | | | |
|---|---|---|---|
| 6,058,476 A * | 5/2000 | Matsuzaki et al. ............ 713/169 |
| 6,353,891 B1 * | 3/2002 | Borella et al. .................... 726/12 |
| 6,766,377 B1 * | 7/2004 | Grabelsky et al. ............ 709/238 |
| 6,889,045 B2 * | 5/2005 | Pan et al. ........................ 455/436 |
| 6,961,857 B1 * | 11/2005 | Floryanzia ....................... 726/14 |
| 6,987,781 B1 * | 1/2006 | Miller et al. .................... 370/496 |
| 7,110,393 B1 * | 9/2006 | Tripathi et al. ................. 370/352 |
| 7,177,642 B2 * | 2/2007 | Herrero et al. ............. 455/435.1 |
| 7,194,071 B2 * | 3/2007 | Rupsis ........................ 379/88.16 |
| 7,583,659 B2 * | 9/2009 | Matsuhashi et al. .......... 370/352 |
| 7,596,212 B2 * | 9/2009 | Ma et al. ................... 379/114.15 |
| 7,634,577 B1 * | 12/2009 | Grabelsky et al. ............ 709/238 |
| 7,680,132 B2 * | 3/2010 | Belling et al. ................ 370/401 |
| 7,920,582 B2 * | 4/2011 | Luo ................................ 370/410 |
| 2002/0087858 A1 * | 7/2002 | Oliver et al. ................... 713/156 |
| 2002/0120760 A1 * | 8/2002 | Kimchi et al. ................ 709/230 |
| 2003/0009337 A1 * | 1/2003 | Rupsis .......................... 704/260 |
| 2003/0193696 A1 * | 10/2003 | Walker et al. ................. 358/402 |
| 2004/0024902 A1 * | 2/2004 | Mikkola ........................ 709/238 |
| 2005/0283607 A1 * | 12/2005 | Zhang et al. .................. 713/170 |
| 2006/0236101 A1 * | 10/2006 | Qiao et al. ..................... 713/168 |
| 2007/0174464 A1 * | 7/2007 | Gan .............................. 709/227 |
| 2008/0080541 A1 * | 4/2008 | Luo ................................ 370/410 |
| 2008/0186952 A1 * | 8/2008 | Lin et al. ....................... 370/352 |

FOREIGN PATENT DOCUMENTS

| CN | 1170995 A | 5/1997 |
| JP | 2002247111 | 8/2002 |

OTHER PUBLICATIONS

Cuervo et al. Network Working group, RFC3015, Nov. 2000, 1-168.*
International Telecommunication Union, Series J: Cable Networks and Transmission of Television, Sound Programme and Other Multimedia Signals—IPCablecom Trunking Gateway Control Protocol (TGCP), Feb. 2002, J.171.
First Chinese Office Action dated (mailed) Sep. 30, 2006, issued in related Chinese Application No. 02144191.X Huawei Technologies C., Ltd (6 pages).
First Chinese Office Action dated (mailed) Mar. 24, 2006, issued in related Chinese Application No. 02144191.X Huawei Technologies C., Ltd (6 pages).
International Preliminary Report on Patentability for International Application No. PCT/CN03/00801, mailed Sep. 22, 2003 Huawei Technologies C., LTD 3 pgs.

* cited by examiner

*Primary Examiner* — David Garcia Cervetti
(74) *Attorney, Agent, or Firm* — Finnegan, Henderson, Farabow, Garrett & Dunner LLP

(57) ABSTRACT

An authentication method for network security includes: configuring a Media Gateway (MG) with an authentication key and setting a security data package on a network protocol by a Media Gateway Controller (MGC); during a security authentication, sending, by the MGC, security authentication request data to the MG using the data package; receiving by the MGC a calculation result obtained by performing an encryption calculation on the request data using the authentication key by the MG; and determining by the MGC whether the MG is legal according to the calculation result.

6 Claims, No Drawings

NETWORK SECURITY AUTHENTICATION METHOD

FIELD OF THE INVENTION

The present invention relates to an authentication method for network security.

BACKGROUND OF THE INVENTION

In the Next Generation Network (NGN), there are many Media Gateways (MGs) based on Media Gateway Control Protocol (MGCP) or H248 protocol (another Media Gateway Control Protocol, i.e., MeGaCo); these numerous MGs are distributed in enterprises or residences widely, and are featured with covering a wide range, having a great quantity, and being based on dynamic IPs. However, because there being no security authentication mechanism on the application layer of MGCP protocol in the current NGN, the MGs using MGCP protocol are poor in security; though H248 protocol has security authentication mechanism on the application layer, i.e., a security header can be added into each transaction request message of H248 protocol, and the security authentication result can be returned in the transaction response message, but the security authentication mechanism requires exchanging a large amount of H248 messages between MGC and MG, resulting in increasing about 40% time for processing of encoding and decoding H248 messages; thus a security authentication solution provided by conventional H248 protocol severely degrades efficiency of the network system and its feasibility in actual application is poor. Therefore, the problems of system security in the NGN, such as forging MG or attacking to MGC are yet not solved.

SUMMARY OF THE INVENTION

An object of the present invention is to provide an effective authentication method for the NGN security.

To attain said object, the authentication method for network security according to the present invention comprises:

step 1: a Media Gateway Controller (MGC) configuring a Media Gateway (MG) with an authentication key, and setting a security data package on a network protocol;

step 2: the MGC, during the security authentication, sending security authentication request data to the MG using the data package; the MG performing an encryption calculation on the request data using the authentication key, and responding to MGC with the encrypted request data;

step 3: the MGC determining whether the MG being authenticated is legal according to the authentication result.

Said network protocol is Media Gateway Control Protocol (MGCP) or H248 protocol.

Said data package comprises: a security authentication request signal and a security authentication completion event; said security authentication request signal comprises a security authentication parameter; said security authentication completion event comprises a security authentication result parameter.

Said step 2 further comprises:

step 21: the MGC sending the security authentication request signal in the data package to the MG;

step 22: the MG, after receiving the security authentication parameter in the security authentication request signal, performing encryption calculation on said parameter using the authentication key, and reporting the encryption calculated result to the MGC through the security authentication result parameter in the security authentication completion event in the data package.

Since the present invention uses a MGC to configure a MG with an authentication key and sets a network protocol security data package for security authentication of MG, it can prevent network access from illegal or forged devices; in addition, since the authentication of MG is performed under the control of MGC, (in other words, the authentication of MG is performed whenever the MGC considers authentication to be necessary), this kind of authentication has a characteristic of randomness and higher security authentication efficiency.

DETAILED DESCRIPTION OF THE EMBODIMENTS

Hereunder the present invention will be further described in detail.

The method according to the present invention is for implementing security management of MGs, which in substance comprising: configuring each MG with an authentication key; when initiating an authentication request, a MGC sends a random number to the MG; the MG, according to the random number sent from the MGC and the authentication key configured for the MG (of course, other information may also be included), performs an encryption calculation, and responds to the MGC with the encrypted result. The MGC performs the same calculation to determine whether the encrypted result is identical to that sent from the MG. If not, the MGC will consider the MG as illegal.

The present invention may be implemented based on H248 protocol or MGCP protocol, thus a security data package on MGCP or H248 protocol needs to be added; said security data package is a collection of a security authentication signal and an event. The security authentication package on MGCP or H248 protocol employed by the present invention comprises a security authentication request signal and a security authentication completion event. Said security authentication request signal comprises a security authentication parameter. Said security authentication completion event comprises a security authentication result parameter. When the MGC is to perform security authentication of the MG, the MGC sends a security authentication request signal to the MG, and at the same time detects the security authentication completion event from the MG. When the MG receives the security authentication request signal sent from the MGC, it performs an encryption calculation in accordance with the authentication key configured thereon and the parameter in the security authentication request signal. Upon completion of the encryption calculation, the MG reports the security authentication completion event to the MGC, with the security encryption result included in the parameter of the security authentication completion event. When the MGC receives the security authentication completion event from the MG, it compares the encryption calculated result included in the parameter of the reported security authentication completion event with the encryption calculated result calculated by itself, determining whether they are identical or not. If not, the MGC will consider the MG as illegal.

Hereunder the above procedures of the present invention are illustrated:

The security data package on MGCP protocol implemented with MGCP protocol as described in the present invention comprises:

Package identifier: Auth; version of data package: 1;
Event included in the data package:
1. Security authentication completion event
Event Identifier: authoc;
Event detection parameter identifier: 32*64 (a hexadecimal number);
Note: the event detection parameter is used to return the authenticated result;

Signal included in the data Package:
1: Security authentication request signal
Signal identifier: authreq;
Signal parameter identifier: 32*64 (a hexadecimal number, 32 to 64 bits);

The parameter in the security authentication request signal is a random number sent from the MGC to the MG. In this example, the random number is a string, which is longer than 16 bits and shorter than 32 bits. Each string is encoded into 2 hexadecimal numbers through ABNF (Augmented Backus-Naur Form) encoding.

The authentication process based on above data package and the pseudo-codes used are:

Step 11: the MGC initiates an authentication request to the MG: the MGC sends a Request Notification (RQNT) command to the MG and allocates Transaction Identifier and Request Identifier, to request the MG to detect the security authentication completion event (auth/authoc); at the same time, it sends a security authentication request signal (auth/authreq), the MGC generates a 16-byte random number (0x78 0x90 0xab 0xcd 0xef 0x56 0x78 0x90 0x00 0x22 0x00 0x22 0x00 0x22 0x00 0x32) as the security authentication parameter of the security authentication request signal.

Step 12: when receiving the Request Notification (RQNT) command sent from the MGC, the MG returns a correct response to this command (the response code being correct response, with the Transaction Identifier identical to that in the Request Notification (RQNT) command sent from the MGC, to acknowledge the MG has received the Request Notification (RQNT) command from the MGC correctly.

Step 13: When detecting a security authentication request signal after it receives the Request Notification (RQNT) command from the MGC, the MG begins to perform a security authentication calculation, i.e., performing an encryption calculation with the parameter taken out from the security authentication request signal and the authentication key configured thereon (the authentication key being assumed as 0x12 0x24 0x56 0x78 0x56 0x32 0x78 0x23 0x24 0x25 0x76 0x32 0x32 0x45 0x45 0x32). The result obtained through the encryption calculation is (0x12 0x34 0xab 0xcd 0xef 0xab 0xef 0x90 0x00 0x22 0x00 0x22 0x67 0x89 0x77 0x88), the MG generates a security authentication completion event and checks whether the MGC has requested to report the security authentication completion event; if detecting that the MGC has requested to report the event, the MG sends a Notify (NTFY) command to the MGC, with the detected event being the security authentication completion event (auth/authoc) and the parameter of the event being the encrypted result. The Request identifier is identical to that in the Request Notification (RQNT) Command sent from the MGC, and the transaction identifier is assigned.

Step 14: when receiving the NTFY command from the MG, the MGC returns a correct response to this command, the response code being correct response, with the Transaction identifier being identical to that in the Notify (NTFY) command reported from the MG, to acknowledge the MGC has received the Notify (NTFY) command from the MG correctly.

Step 15: when receiving the encrypted result reported from the MG, the MGC compares the result with the encrypted result calculated by itself; if the two results are identical to each other, the MGC considers the MG as legal; if the two results are not identical to each other or the MG doesn't report the encrypted result within a predefined time, the MGC considers the MG as illegal.

The security data package on H248 protocol implemented over H248 protocol according to the present invention comprises:
Package identifier: auth; version of the data package: 1;
Event in the data package:
1: Security authentication completion event
Event identifier: authoc (0x0001);
Event detection parameter identifier: authenticated result;
Parameter identifier: Res;
ABNF code of the parameter value: 32*64 (a hexadecimal number, 32 to 64 bits);
ASN.1 (abstract symbol notation) code of the parameter value: OCTET STRING (SIZE (16 ... 32)); (octet of 16 to 32 bits)

Signal included in the data package:
1: Security authentication request signal
Signal identifier: authreq
Name of the signal parameter: request parameter;
Parameter identifier: parm;
ABNF code of the parameter value: 32*64 (a hexadecimal number);
ASN.1 code of the parameter value: OCTET STRING (SIZE (16 ... 32))

The Authentication process based on above data package and the pseudo-codes used are:

Step 21: the MGC initiates an authentication request to the MG: the MGC sends a Modify command to the MG and allocates a Transaction Identifier and a Request Identifier, to request the MG to detect the security authentication completion event (auth/authoc); at the same time, the MGC sends a security authentication request signal (auth/authreq), and generates a 16-byte random number (0x78 0x90 0xab 0xcd 0xef 0x56 0x78 0x90 0x00 0x22 0x00 0x22 0x00 0x22 0x00 0x32) as the security authentication parameter of the security authentication request signal.

Step 22: when receiving the Modify command from the MGC, the MG returns a correct response to this command, with the Transaction Identifier identical to that in the Modify command, to acknowledge the MG has received the Modify command from the MGC correctly.

Step 23: When detecting a security authentication request signal after receiving the Modify command from the MGC, the MG begins to perform a security authentication calculation, i.e., performing an encryption calculation with the parameter taken out from the security authentication request signal and the authentication key configured thereon (the authentication key being assumed as: 0x12 0x24 0x56 0x78 0x56 0x32 0x78 0x23 0x24 0x25 0x76 0x32 0x32 0x45 0x45 0x32). The result obtained through the encryption calculation is (0x12 0x34 0xab 0xcd 0xef 0xab 0xef 0x90 0x00 0x22 0x00 0x22 0x67 0x89 0x77 0x88). The MG generates a security authentication completion event and checks whether the MGC has requested to report the encryption completion event; if detecting the MGC has requested to report the event, the MG sends a Notify (NTFY) command to the MGC, with the detected event being the security authentication completion event (auth/authoc) and the event parameter being the encrypted result. The Request Identifier is identical to that in the Modify Command sent from the MGC, and the Transaction Identifier is assigned.

Step 24: when receiving the Notify command from the MG, the MGC returns a correct response to this command, with the Transaction Identifier being identical to that in the Notify (NTFY) command sent from the MG, to acknowledge the MGC has received the Notify (NTFY) command from the MG correctly.

Step 25: when receiving the encrypted result reported from the MG, the MGC compares the result with the encrypted result calculated by itself; if the two results are identical to each other, it considers the MG as legal; if the two results are not identical to each other or the MG doesn't report the encrypted result within a predefined time, it considers the MG as illegal.

The invention claimed is:

1. An authentication method for network security, comprising the following steps:

configuring a Media Gateway (MG) with an authentication key and setting a security data package, which is a collection of a security authentication signal and an event, on a network protocol, by a Media Gateway Controller (MGC);

during a security authentication, sending by the MGC a security authentication request containing a security authentication parameter to the MG using the security data package;

performing an encryption calculation and obtaining a calculation result according to the security authentication parameter and the authentication key, by the MG;

reporting the calculation result to the MGC, by the MG; and determining by the MGC whether the MG is legal by comparing the calculation result obtained according to the security authentication parameter and the authentication key with a result calculated by the MGC, wherein sending by the MGC a security authentication request comprises:

sending, by the MGC, a Request Notification command or a Modify command to the MG, and, allocating a Request Identifier to request the MG to detect a security authentication completion event, and wherein reporting the calculation result to the MGC by the MG comprises:

generating, by the MG, the security authentication completion event, and checking, by the MG, whether the MGC has requested to report the security authentication completion event, if the MGC has requested to report the event, sending, by the MG, to the MGC a Notify command with the detected event being the security authentication completion event and a parameter of the event being the encrypted result, a Request identifier of the Notify command being identical to the Request identifier allocated by the MGC.

2. The authentication method for network security according to claim 1, wherein said network protocol is Media Gateway Control Protocol (MGCP).

3. The authentication method for network security according to claim 1, wherein said network protocol is H248 protocol.

4. The authentication method for network security according to claim 1, wherein the security authentication parameter is a random number.

5. An authentication method applicable in a Next Generation Network (NGN) for network security, comprising the following steps:

configuring a Media Gateway (MG) with an authentication key and setting a security data package, which is a collection of a security authentication signal and an event, on a network protocol, by a Media Gateway Controller (MGC);

during a security authentication, sending by the MGC a security authentication request containing a security authentication parameter to the MG using the security data package;

performing an encryption calculation and obtaining a calculation result according to the security authentication parameter and the authentication key, by the MG;

reporting the calculation result to the MGC, by the MG; and determining by the MGC whether the MG is legal by comparing the calculation result obtained according to the security authentication parameter and the authentication key with a result calculated by the MGC, wherein sending by the MGC a security authentication request comprises:

sending, by the MGC, a Request Notification command or a Modify command to the MG, and, allocating a Request Identifier to request the MG to detect a security authentication completion event, and wherein reporting the calculation result to the MGC by the MG comprises:

generating, by the MG, the security authentication completion event, and checking, by the MG, whether the MGC has requested to report the security authentication completion event, if the MGC has requested to report the event, sending, by the MG, to the MGC a Notify command with the detected event being the security authentication completion event and a parameter of the event being the encrypted result, a Request identifier of the Notify command being identical to the Request identifier allocated by the MGC.

6. A system for network security, comprising a Media Gateway (MG) and a Media Gateway Controller (MGC), wherein, the MGC configures the MG with an authentication key and sets a security data package, which is a collection of a security authentication signal and an event, on a network protocol, sends a security authentication request containing a security authentication parameter to the MG using the security data package during a security authentication;

the MG performs an encryption calculation and obtains a calculation result according to the security authentication parameter and the authentication key, and reports the calculation result to the MGC; and the MGC determines whether the MG is legal by comparing the calculation result obtained according to the security authentication parameter and the authentication key with a result calculated by the MGC, the MGC sending a security authentication request to the MG comprises:

sending, by the MGC, a Request Notification command or a Modify command to the MG, and, allocating a Request Identifier to request the MG to detect a security authentication completion event, and the MG reporting the calculation result to the MGC comprises:

generating, by the MG, the security authentication completion event, and checking, by the MG, whether the MGC has requested to report the security authentication completion event, if the MGC has requested to report the event, sending, by the MG, to the MGC a Notify command with the detected event being the security authentication completion event and a parameter of the event being the encrypted result, a Request identifier of the Notify command is identical to the Request identifier allocated by the MGC.

* * * * *